United States Patent
Archer

(10) Patent No.: US 9,167,312 B2
(45) Date of Patent: Oct. 20, 2015

(54) PAUSE-BASED ADVERTISING METHODS AND SYSTEMS

(75) Inventor: Don G. Archer, Euless, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 313 days.

(21) Appl. No.: 12/624,628

(22) Filed: Nov. 24, 2009

(65) Prior Publication Data

US 2011/0126102 A1    May 26, 2011

(51) Int. Cl.
*H04H 60/56* (2008.01)
*H04N 21/81* (2011.01)
*H04N 21/442* (2011.01)
*H04N 21/4147* (2011.01)
*H04N 21/472* (2011.01)
*G06Q 30/02* (2012.01)

(52) U.S. Cl.
CPC ......... *H04N 21/812* (2013.01); *H04N 21/4147* (2013.01); *H04N 21/44218* (2013.01); *H04N 21/44222* (2013.01); *H04N 21/472* (2013.01); *G06Q 30/0242* (2013.01)

(58) Field of Classification Search
CPC . G03F 3/00; G03F 17/30867; G06Q 30/0273; G06Q 30/02; G06Q 30/0241; H04N 21/4147; H04N 21/812; H04N 21/472; H04N 21/44222; H04N 21/84; H04N 21/4532; H04N 21/4312; H04H 60/47; H04H 60/73
USPC ......... 715/716; 348/E5.007, E7.031, E7.071; 725/12, 34, 88, 97, 135, 136
See application file for complete search history.

(56) References Cited

U.S. PATENT DOCUMENTS

| | | | |
|---|---|---|---|
| 8,060,904 B1* | 11/2011 | Evans et al. | 725/35 |
| 2003/0070182 A1* | 4/2003 | Pierre et al. | 725/135 |
| 2004/0034874 A1* | 2/2004 | Hord et al. | 725/136 |
| 2004/0103028 A1* | 5/2004 | Littman et al. | 705/14 |
| 2006/0168664 A1* | 7/2006 | Frank et al. | 726/27 |
| 2006/0206379 A1* | 9/2006 | Rosenberg | 705/14 |
| 2006/0225106 A1* | 10/2006 | Bedingfield | 725/95 |
| 2007/0300261 A1* | 12/2007 | Barton et al. | 725/58 |
| 2008/0004953 A1* | 1/2008 | Ma et al. | 705/14 |
| 2008/0077955 A1* | 3/2008 | Haberman | 725/35 |
| 2008/0319827 A1 | 12/2008 | Yee et al. | |
| 2009/0025024 A1* | 1/2009 | Beser et al. | 725/12 |
| 2009/0064227 A1* | 3/2009 | Eronen et al. | 725/46 |
| 2010/0076842 A1* | 3/2010 | Berlec | 705/14.49 |

FOREIGN PATENT DOCUMENTS

JP    2007066311 A  *  3/2007

OTHER PUBLICATIONS

JP 2007-066311 (published on Mar. 15, 2007) in English translation "Management System and Management Method for Advertisement and Coupon Presentation for Vehicle".*

* cited by examiner

*Primary Examiner* — Alvin Tan
*Assistant Examiner* — Rinna Yi

(57) ABSTRACT

An exemplary method includes monitoring an interaction of a user with a media content access subsystem, receiving a command input by the user to pause a media content instance being presented by the media content access subsystem, and dynamically selecting at least one advertisement in accordance with the monitored interaction for presentation to the user by the media content access subsystem while the media content instance is paused. Corresponding methods and systems are also described.

22 Claims, 8 Drawing Sheets

PAUSE-BASED ADVERTISING METHODS AND SYSTEMS

BACKGROUND INFORMATION

Set-top boxes and other media content access devices are often configured to provide users with access to a large number and variety of media content choices. For example, a user may choose to experience a variety of broadcast television programs, pay-per-view services, video-on-demand programming, Internet services, and audio programming via a set-top box.

Many media content access devices include a digital video recording ("DVR") application that allows a user to view or otherwise experience media content in one or more "trick play" modes. For example, a user may pause a presentation of a media content instance, skip to a different position within a media content instance, fast forward within a media content instance, and/or rewind within a media content instance.

DVR technology has had a significant impact on the advertising industry. In the past, the basic business model for broadcast television programming has been free or low cost distribution of media content, subsidized by the insertion of advertisements within a media content stream. However, DVR applications allow users to easily skip these advertisements. Hence, alternative approaches to distributing advertisements to DVR users are desirable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
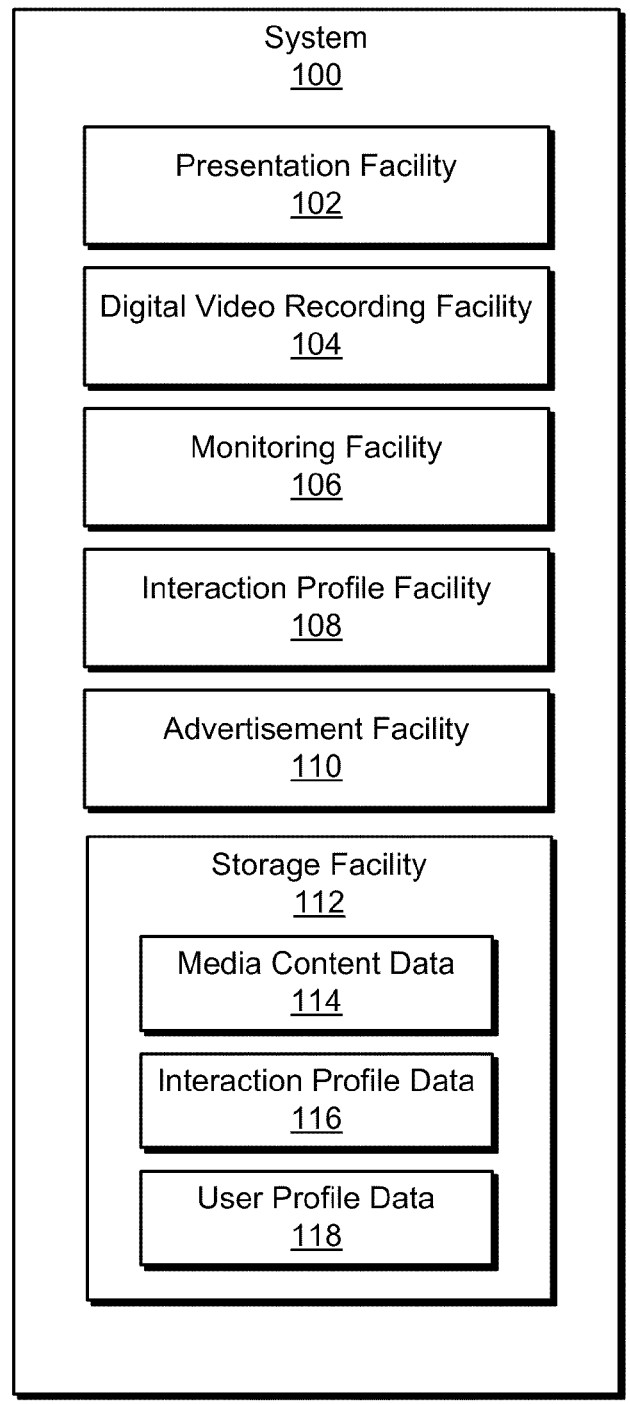
FIG. 1 illustrates an exemplary media content access system according to principles described herein.

Exemplary methods and systems for dynamically selecting one or more advertisements for presentation to a user while a media content instance is paused are described herein. As described in more detail below, an interaction of a user with a media content access subsystem may be monitored. A command input by a user to pause a media content instance being presented by the media content access subsystem may be received. At least one advertisement may be selected in accordance with the monitored interaction for presentation to the user by the media content access subsystem while the media content instance is paused. It will be recognized that references included herein to a media content instance being paused mean that a presentation of the media content instance is paused.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, video game, image, photograph, sound, or any segment, component, or combination of these or other forms of media content that may be viewed or otherwise experienced by a user.

In some examples, as will be described in more detail below, an "audio-based advertisement" may be selected and presented to a user in accordance with a monitored interaction of the user with a media content access subsystem. As used herein, an audio-based advertisement includes an advertisement that targets a person who may be only listening to audio presented by the media content access subsystem. Hence, an audio-based advertisement may include or focus on an audible message (e.g., a jingle, a spoken message, etc.). In some examples, an audio-based advertisement may additionally include one or more visual components (e.g., video and/or one or more images).

In some alternative examples, as will be described in more detail below, a "visual-based advertisement" may be selected and presented to a user in accordance with a monitored interaction of the user with a media content access subsystem. As used herein, a visual-based advertisement includes an advertisement that targets a person who may be only watching video presented by the media content access subsystem. Hence, a visual-based advertisement may include or focus on a visual message (e.g., a video and/or one or more images). In some examples, a visual-based advertisement may additionally include one or more audio components.

Dynamic selection of one or more advertisements for presentation to a user while a media content instance is paused may result an optimized media content access experience for a user and in an optimized advertisement campaign for one or more advertisers. In particular, advertisers may more effectively reach their intended audiences, content providers may more effectively charge for advertisement placement, and users may more effectively respond to such advertisements.

FIG. 1 illustrates an exemplary media content access system 100 (or simply "system 100"). As will be described in more detail below, system 100 may be configured to facilitate customized presentation of one or more advertisements to a user of a media content access subsystem (e.g., a set-top box device ("STB")) in accordance with how the user interacts with the media content access subsystem.

System 100 may include, but is not limited to, a presentation facility 102, a digital video recording ("DVR") facility 104, a monitoring facility 106, an interaction profile facility 108, an advertisement facility 110, and a storage facility 112. Each of these facilities will now be described in more detail.

Presentation facility 102 may be configured to present media content for experiencing by a user. A presentation of media content may be performed in any suitable way such as generating and/or providing output signals representative of media content to a display device (e.g., a television) and/or an audio output device. For example, presentation facility 102 may display, play, or otherwise present a television program, an advertisement, or any other type of media content instance for experiencing by a user.

Digital video recording facility 104 may be configured to facilitate temporary and/or permanent recording of selected media content to storage facility 112. Hence, digital video recording facility 104 enables a user to experience media content in "trick play," or non-linear, modes. For example, digital video recording facility 104 may be configured to receive and execute one or more commands input by a user that are configured to pause a presentation of a media content instance, resume a presentation of a media content instance, skip to a different position within a media content instance, fast forward within a media content instance, and/or rewind within a media content instance.

Monitoring facility 106 may be configured to monitor an interaction of a user with a media content access subsystem. For example, monitoring facility 106 may be configured to detect the occurrence of one or more "interaction events" performed by or otherwise associated with the user. Each interaction event, or lack thereof, may be indicative of a type or level of interaction of the user with the media content access subsystem.

To facilitate monitoring of an interaction of a user with a media content access subsystem, monitoring facility 106 may include one or more video cameras, microphones, motion detectors, accelerometers, and/or any other sensor as may serve a particular application. Examples of monitoring an interaction of a user with a media content access subsystem using one or more of these sensors will be described in more detail below.

Interaction profile facility 108 may be configured to maintain an interaction profile associated with a user of the media content access subsystem. The interaction profile may be configured to represent how the user interacts with the media content access subsystem and may be dynamically updated by interaction profile facility 108 as monitoring facility 106 detects various interaction events performed by the user.

Advertisement facility 110 may be configured to control a presentation of one or more advertisements to the user by the media content access subsystem in accordance with the monitored interaction of the user, an interaction profile associated with the user, a user profile associated with the user, and/or any other factor as may serve a particular application. For example, advertisement facility 110 may be configured to dynamically select at least one advertisement for presentation to the user in accordance with a monitored interaction of the user with the media content access subsystem while a media content instance being presented by the media content access subsystem is paused. Advertisement facility 110 may be further configured to dynamically select at least one advertisement for presentation to the user after presentation of a paused media content instance has been resumed by the user.

Storage facility 112 may be configured to maintain media content data 114 representative of one or more media content instances accessible via a media content access subsystem, interaction profile data 116 representative of an interaction profile associated with a user of the media content access subsystem, and user profile data 118 representative of a user profile associated with a user of the media content access subsystem. It will be recognized that storage facility 112 may maintain additional or alternative data as may serve a particular application.

System 100, including facilities 102-112, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-112 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
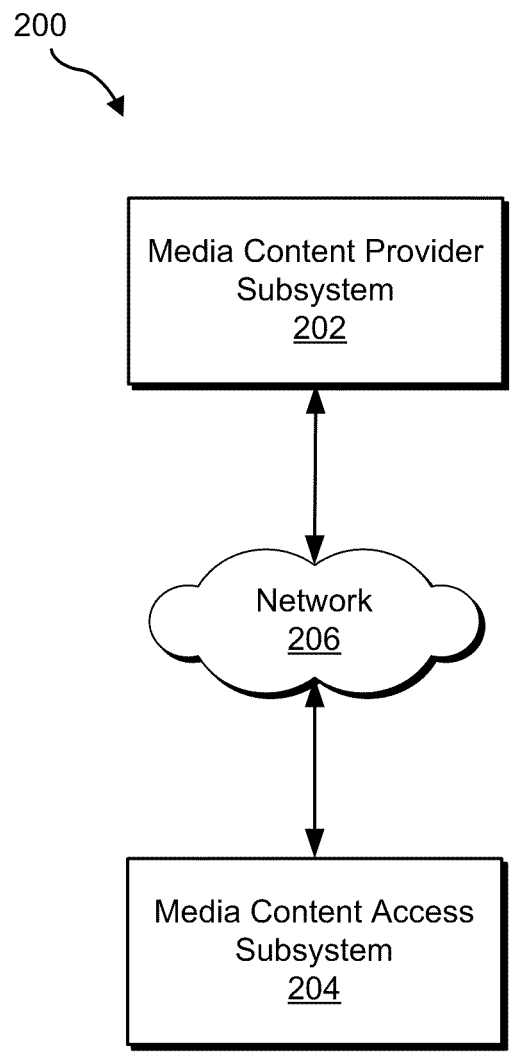
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, presentation facility 102, digital video recording ("DVR") facility 104, monitoring facility 106, interaction profile facility 108, advertisement facility 110, and storage facility 112 may each be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

In some examples, provider subsystem 202 may be configured to generate or otherwise provide media content (e.g., one or more advertisements) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, etc.

Figure 3:
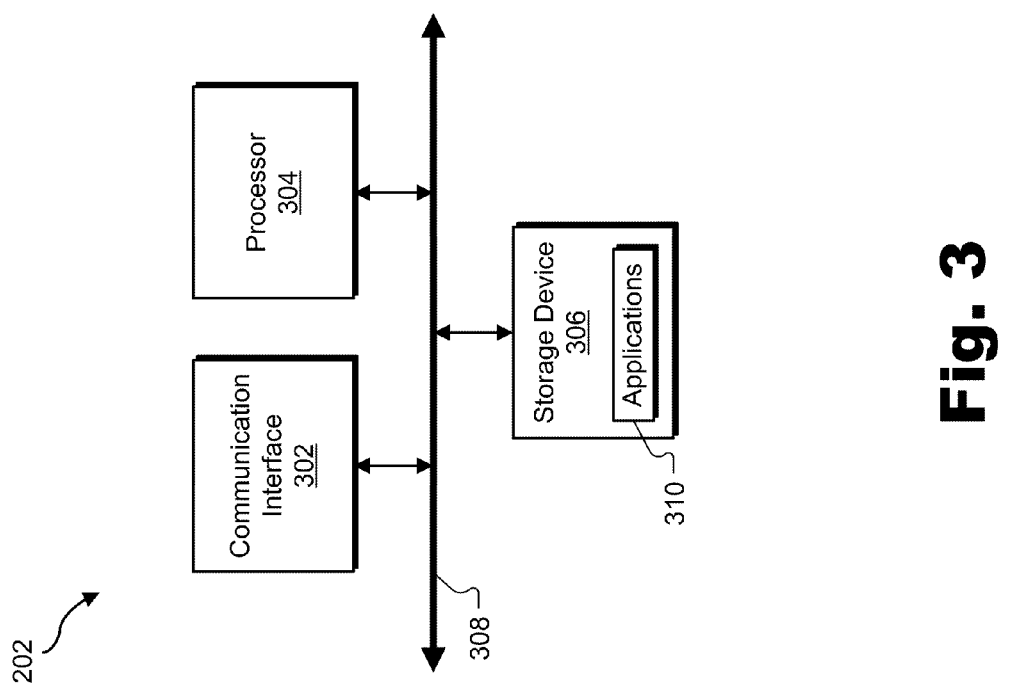
FIG. 3 illustrates exemplary components of a media content provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit (e.g., broadcast, multicast, and/or narrowcast) data representative of one or more media content instances to access subsystem 204. Such data may be transmitted in one or more media content data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, presentation facility 102, digital video recording ("DVR") facility 104, monitoring facility 106, interaction profile facility 108, advertisement facility 110, and/or storage facility 112 may be implemented by or within one or more components of provider subsystem 202. For example, one or more applications 310 residing within storage device 306 may be configured to direct processor 304 to perform one or more processes or functions associated with presentation facility 102, digital video recording ("DVR") facility 104, monitoring facility 106, interaction profile facility 108, and/or advertisement facility 110. Likewise, storage facility 112 may be implemented by or within storage device 306. For example, media content data 114, interaction profile data 116, and/or user profile data 118 may be stored within storage device 306.

Figure 4:
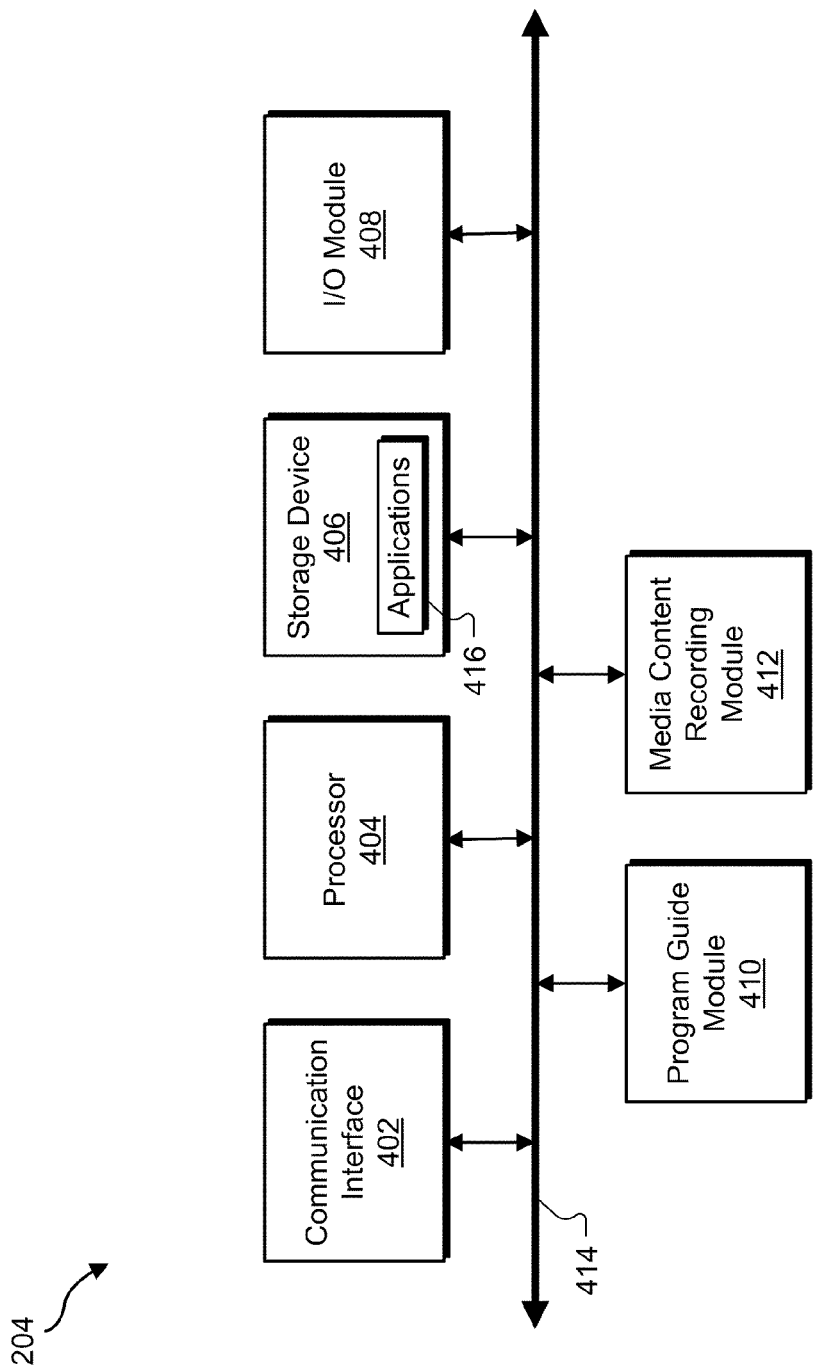
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, an input/output ("I/O") module 408, a program guide module 410, and a media content recording module 412 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a set-top box, a communications device, a mobile device (e.g., a mobile phone device), a hand-held device, a personal computer, a phone device (e.g., Verizon Hub device), a personal-digital assistant device, gaming device, a DVR device, a television device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 202 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 202 may transmit (e.g., broadcast, multicast, and/or narrowcast) data representative of one or more media content instances. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, provider subsystem 202 may be configured to transmit and access subsystem 204 may be configured to receive data streams or signals including data representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 204. The term "media content carrier channel" or simply "channel" as used herein may refer generally to any carrier of media content, including, but not limited to, media (e.g., television) channels, streams, addresses, frequencies or other carriers of media content.

Communication interface 402 may be configured to selectively identify, receive, and/or process appropriate data streams and/or media content instances at the scheduled transmission times and on the appropriate media content carrier channels. For instance, in certain implementations communication interface 402 may include a tuner configured to selectively receive media content carried on a particular media content carrier channel. The tuner may be tuned to a particular media content carrier channel such that the media content carried on the media content carrier channel is received and may be processed by access subsystem 204.

In some examples, communication interface 402 may include multiple tuners such that media content carried on different media content carrier channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 202, additionally or alternatively, communication interface 402 may be configured to receive other types of signals (e.g., other types of media content carrying signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 416 or other computer-executable instructions such as may be stored in storage device 406 or another computer-readable medium. As an example, processor 404 may be configured to process data, including demodulating, decoding, and/or parsing data (e.g., data representative of media content received from provider subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may representative of one or more graphical user interfaces ("GUIs"), GUI views, media content views, and/or any other view as may serve a particular application.

Program guide module 410 may be configured to maintain and operate on program guide data. As mentioned above, media content instances may be transmitted by provider subsystem 202 at scheduled transmission times and on certain media content carrier channels. To assist access subsystem 204 and/or a user of access subsystem 204 with reception of media content instances at appropriate scheduled transmission times and on appropriate media content carrier channels, program guide data may be received by communication interface 402 from provider subsystem 202 and/or from another source. The program guide data may be stored in storage device 406.

Media content recording module 412 may be configured to record data representative of media content to storage device 406. The recording of a media content instance is typically performed during a transmission time slot when data representative of the media content instance is received from provider subsystem 202 as described above. For example, during transmission of a media content instance from provider subsystem 202 to access subsystem 204 on a media content carrier channel, communication interface 402 may receive data representative of the media content instance on the media content carrier channel, and media content recording module 412 may direct that the received data representative of the media content instance be stored to storage device 406. Once stored, the data representative the media content instance may be accessed and processed as may suit a particular application, including providing data representative of the media content instance to a display for presentation to a user.

In some examples, presentation facility 102, digital video recording ("DVR") facility 104, monitoring facility 106, interaction profile facility 108, advertisement facility 110, and/or storage facility 112 may be implemented by or within one or more components of access subsystem 204. For example, one or more applications 416 residing within storage device 406 may be configured to direct processor 404 to perform one or more processes or functions associated with presentation facility 102, digital video recording ("DVR") facility 104, monitoring facility 106, interaction profile facility 108, and/or advertisement facility 110. Likewise, storage facility 112 may be implemented by or within storage device 406. For example, media content data 114, interaction profile data 116, and/or user profile data 118 may be stored within storage device 406.

Figure 5:
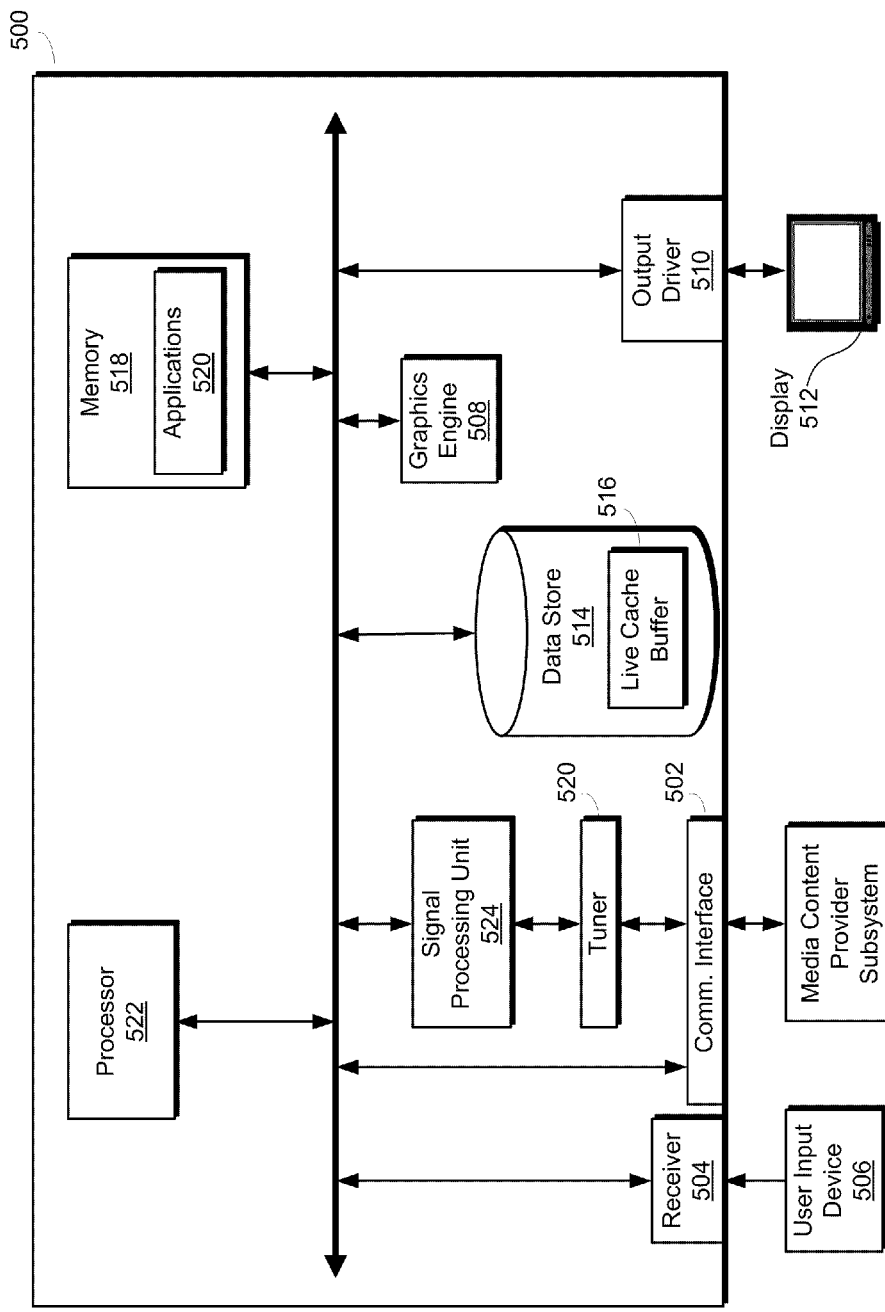
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 (or simply "device 500") having access subsystem 204 implemented thereon. Device 500 may include one or more of the components of access subsystem 204 shown in FIG. 4 and may be configured to perform one or more of the processes and/or operations described herein. Device 500 may include, but is not limited to, a set-top box, a media content processing device, a communications device, a mobile device (e.g., a mobile phone device), a handheld device, a personal computer, a phone device (e.g., Verizon Hub device), a personal-digital assistant device, a gaming device, a DVR device, a television device, and/or any device configured to perform one or more of the processes and/or operations described herein.

As shown in FIG. 5, device 500 may include a communication interface 502 configured to receive media content (e.g., media content) and/or data (e.g., metadata, program guide data, and/or any other data associated with media content) in any acceptable format from provider subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Device 500 may also include a receiver 504 configured to receive user input signals from a user input device 506. User input device 506 may include, for example, a remote control device or any other suitable input device and may be configured to communicate with receiver 504 via a wireless link, electrical connection, or any other suitable communication link.

Figure 6:
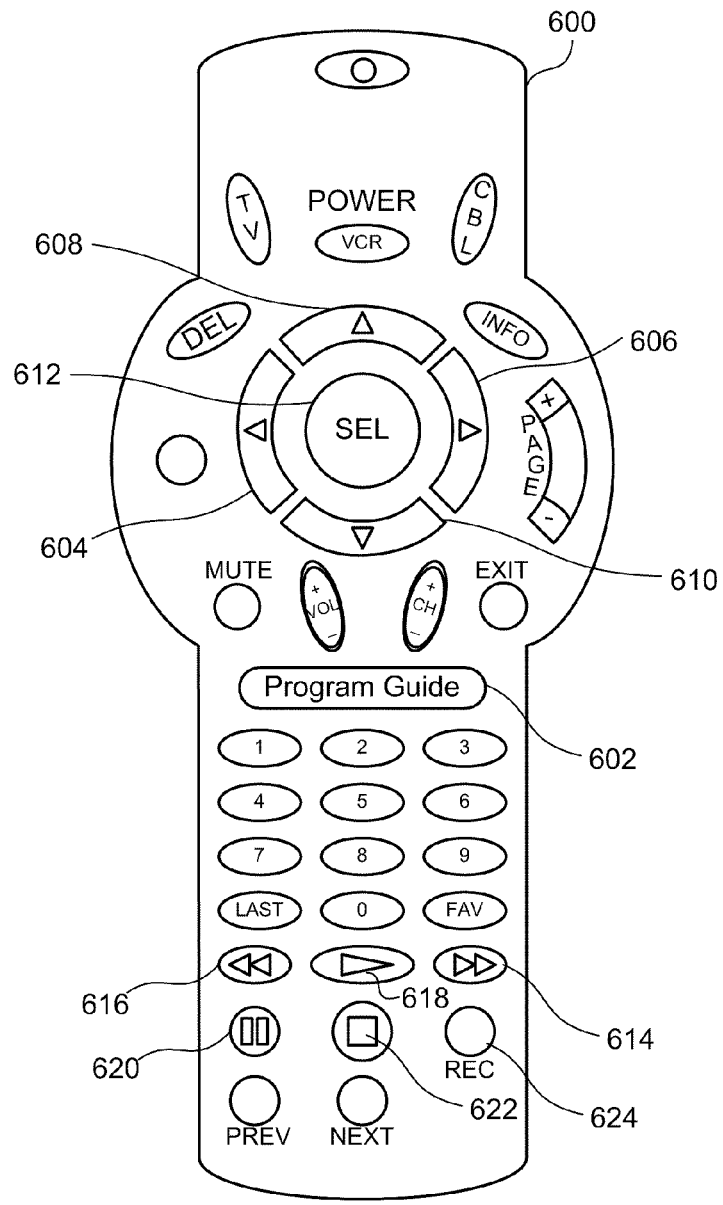
FIG. 6 illustrates an exemplary remote control user input device according to principles described herein.

FIG. 6 illustrates an exemplary remote control device 600 that may implement user input device 506. In some examples, remote control device 600 may be configured to facilitate a user controlling operations of access subsystem 204. For instance, a program guide button 602 may be configured to evoke a presentation of a program guide GUI on a display. A left button 604, a right button 606, an up button 608, a down button 610, and a select button 612 may be included and configured to facilitate a user evoking and/or navigating through various views, options, and GUIs displayed by a display. A fast forward or skip button 614, a reverse or rewind button 616, a play button 618, a pause button 620, a stop button 622, and/or a record button 624 may also be included and configured to facilitate a user navigating through, recording, pausing, and/or otherwise interacting with one or more media content instances. Remote control device 600 is merely illustrative of one of the many different types of user input devices that may be used to provide input commands to access subsystem 204.

Returning to FIG. 5, device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content and/or program guide media content) generated by graphics engine 508 and to be presented by display 512 for experiencing by a user. For example, output driver 510 may provide a data representative of a GUI including a program guide view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within device 500 in FIG. 5 for illustrative purposes only. It will be understood that data store 514 may additionally or alternatively be located external to device 500.

Data store 514 may include one or more live cache buffers 516. Live cache buffer 516 may additionally or alternatively reside in memory 518 or in a storage device external to device 500. In some examples, media content data may be temporarily stored in live cache buffer 516 to facilitate recording of media content and/or presentation of media content in one or more trick play modes.

Device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 520 configured to run on or otherwise be executed by device 500 may reside in memory 518.

Device 500 may include one or more tuners 520. Tuner 520 may be configured to selectively receive media content carried on a particular media content carrier channel such that the media content may be processed by device 500. In some examples, media content received by tuner 520 may be temporarily buffered, or stored, in the live cache buffer 516. If there are multiple tuners 520, there may be a live cache buffer 516 corresponding to each of the tuners 520.

While tuner 520 may be used to receive certain media content-carrying signals transmitted by provider subsystem 202, device 500 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 502 may receive and forward the signals directly to other components of device 500 (e.g., processor 522 or signal processing unit 524, described in more detail below) without the signals going through tuner 520. For an IP-based signal, for example, signal processing unit 524 may function as an IP receiver.

Device 500 may include at least one processor, such as processor 522, configured to control and/or perform one or more operations of device 500. Device 500 may also include a signal processing unit 524 configured to process incoming media content. Signal processing unit 524 may be configured, for example, to demodulate and parse encoded digital media content. In some examples, device 500 may include one or more signal processing units 524 corresponding to each of the tuners 520.

As mentioned, a user may input a command to access subsystem 204 (e.g., media content access device 500) to pause a media content instance being presented by the access subsystem 204. A media content instance may be paused by a user for any of a variety of reasons. For example, a user may temporarily pause a media content instance to talk to another person, answer the telephone, check email, use the bathroom, or get something to eat. The user may additionally or alternatively pause a media content instance for a relatively longer period of time to go to work, take a nap, or run an errand. Additional or alternative reasons for pausing a media content instance may exist that are specific to the particular user interacting with access subsystem 204.

Depending on what the user is doing while the media content instance is paused, it may be desirable to present one or more advertisements to the user via access subsystem 204 while the media content instance is paused. For example, a user may pause a media content instance to check email without leaving the premises of access subsystem 204. In this instance, it may be desirable to present an audio-based advertisement to the user that the user can listen to while checking email. As another example, a user may pause a media content instance to talk to another person. In this instance, it may be desirable to present a visual-based advertisement to the user so that the user can see the advertisement while talking to the other person. Hence, as will be described in more detail below, the methods and systems described herein facilitate dynamic selection of one or more advertisements for presentation to a user by access subsystem 204 while a media content instance presented by access subsystem 204 is in a paused state.

Figure 7:
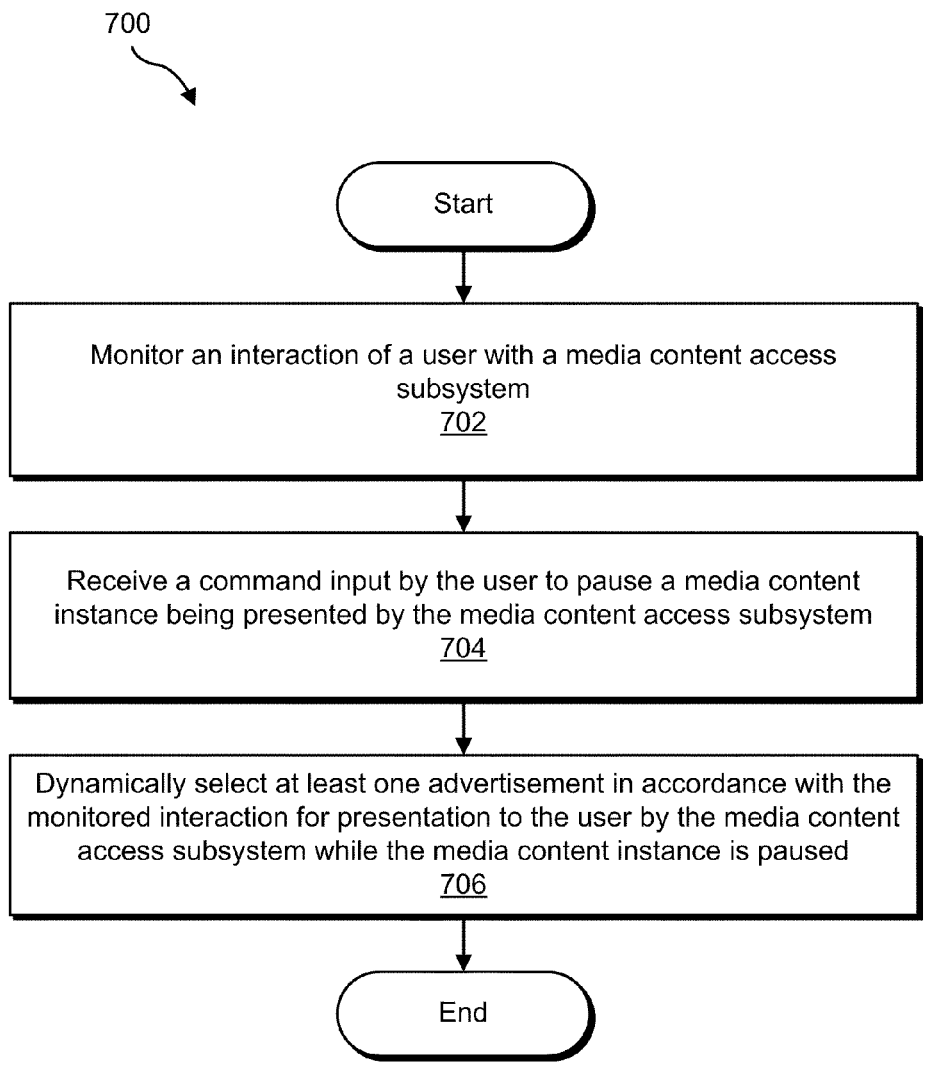
FIG. 7 illustrates an exemplary pause-based advertising method according to principles described herein.

FIG. 7 illustrates an exemplary pause-based advertising method 700. While FIG. 7 illustrates exemplary steps according to one embodiment, other embodiments may omit, add to, reorder, and/or modify any of the steps shown in FIG. 7.

In step 702, an interaction of a user with a media content access subsystem is monitored. For example, monitoring facility 106 may detect one or more interaction events performed by or otherwise associated with the user. Exemplary interaction events that may be detected by monitoring facility 106 will be described in more detail below. The interaction of the user with the media content access subsystem may be monitored before and/or after a user inputs a command to pause a media content instance being presented by the media content access subsystem.

In step 704, a command input by the user to pause a media content instance being presented by the media content access subsystem is received. The command may be input and received in any of the ways described herein. For example, digital video recording facility 104 may receive the pause command from a remote control device (e.g., remote control device 600) used by the user.

In step 706, at least one advertisement is dynamically selected in accordance with the interaction monitored in step 702 for presentation to the user by the media content access subsystem while the media content instance is paused. For example, advertisement facility 110 may dynamically select at least one advertisement to be presented to the user while the media content instance is paused based on a level of interaction of the user with the media content access subsystem prior to and/or during the pause time period. Examples of dynamically selecting at least one advertisement based in accordance with a monitored interaction of a user with a media content access subsystem will be given below.

Figure 8:
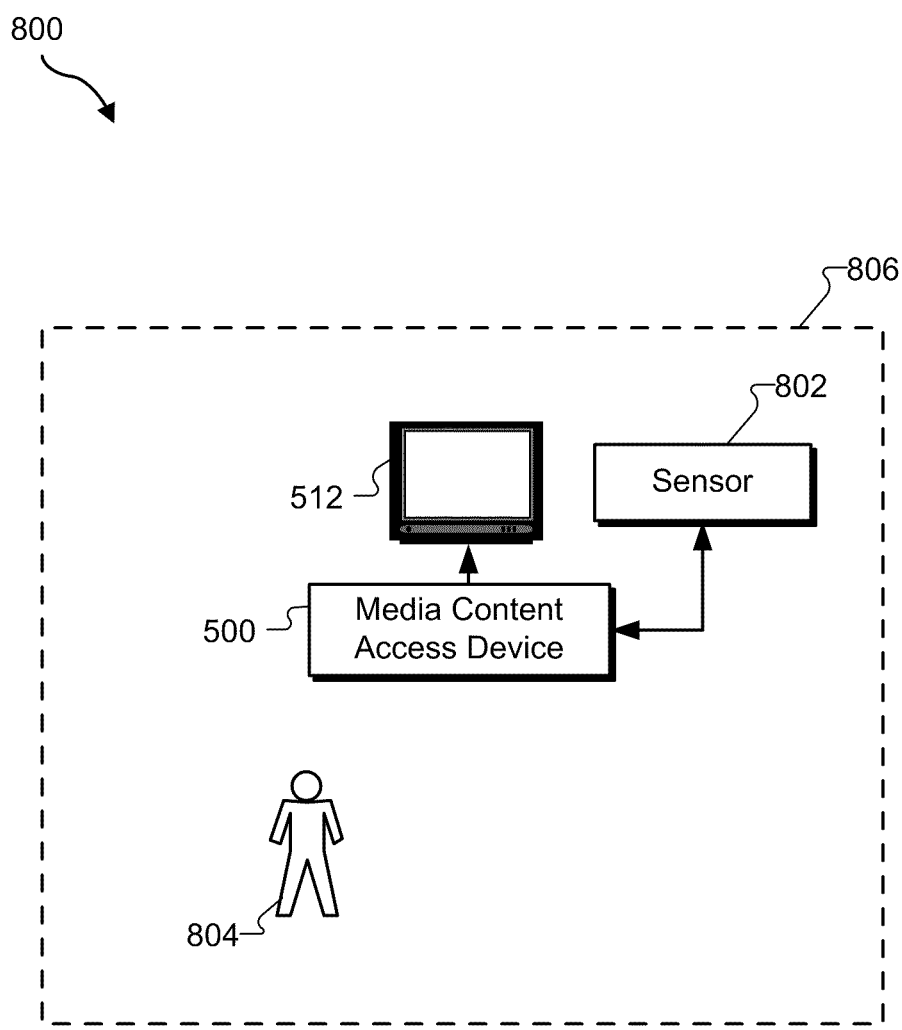
FIG. 8 illustrates an exemplary implementation of the system of FIG. 1 according to principles described herein.

FIG. 8 illustrates an exemplary implementation 800 of system 100 wherein monitoring facility 106 is implemented by or within a sensor 802 communicatively coupled to media content access device 500. Sensor 802 is shown in FIG. 8 to be a separate device than media content access device 500 for illustrative purposes only. It will be recognized that in some alternative examples, sensor 802 may be implemented by or included within media content access device 500. However, it will be assumed in the examples given herein that sensor 802 includes a device separate from media content access device 500 as shown in FIG. 8.

Sensor 802 may include one or more hardware and/or software components configured to perform any of the functions associated with monitoring facility 106. For example, sensor 802 may include, but is not limited to, one or more video cameras, microphones, motion detectors, accelerometers, and/or any other sensor as may serve a particular application.

In some examples, sensor 802 may be configured to detect an interaction of a user 804 within a monitoring zone 806 associated with media content access device 500 and/or display 512. Monitoring zone 806 may include a premises of media content access device 500 and/or display 512 (e.g., a room in which media content access device 500 and/or display 512 is physically located) and/or any other physical area in which a user may be located while experiencing media content presented by a media content access device 500.

FIG. 8 will be used to describe various examples of monitoring an interaction of a user with a media content access subsystem (e.g., with media content access device 500 and/or display 512) and using the monitored interaction to dynamically select at least one advertisement for presentation to the user by the media content access subsystem while a media content instance being presented by the media content access subsystem is paused. As will be described below, the monitoring may be performed while the media content instance is paused and/or during a predetermined period of time immediately prior to the receiving of the command to pause the media content instance. It will be recognized that the specific examples given herein are merely illustrative of the many different examples and/or implementations of the methods and systems described herein.

In some examples, sensor 802 may be configured to monitor an interaction of user 804 with media content access device 500 and/or display 512 by detecting a movement of user 804 within monitoring zone 806 while a media content instance being presented by media content access device 500 is paused. For example, sensor 802 may detect that after pausing the media content instance, user 804 begins to walk out of monitoring zone 806 (e.g., out of a room in which display 512 is located). In this example, advertisement facility 110 may select a relatively short duration advertisement to present to user 804 while user 804 is exiting monitoring zone 806. In this manner, user 804 is likely to experience the entire advertisement prior to leaving monitoring zone 806.

Additionally or alternatively, sensor 802 may detect that user 804 has moved outside of monitoring zone 806. For example, sensor 802 may detect that user 804 has left the room in which display 512 is located to go to another room within the user's home. In response to the detected movement of user 804 to a location outside of monitoring zone 806, advertisement facility 110 may select an audio-based advertisement for presentation to the user 804. User 804 may still be able to hear the audio-based advertisement even though he or she has left monitoring zone 806. If sensor 802 detects that user 804 has remained outside monitoring zone 806 for a relatively long period of time, advertisement facility 110 may prevent media content access device 500 from presenting advertisements until user 804 returns to monitoring zone 806.

Sensor 802 may be additionally or alternatively configured to monitor an interaction of user 804 with media content access device 500 and/or display 512 by detecting a handling by user 804 of a remote control device associated with media content access device 500. For example, sensor 802 may include an accelerometer included within remote control device 600 and configured to detect whether user 804 is handling remote control device 600.

If sensor 802 detects that remote control device 600 is still being handled by user 804 after user 804 pauses a presentation of a media content instance by media content access subsystem 500, it may be indicative that the user 804 is still viewing display 512. In such an instance, advertisement facility 110 may dynamically select at least one visual-based advertisement for presentation to user 804 while the media content instance is paused.

Alternatively, sensor 802 may be configured to detect that a user has stopped handling remote control device 600. This may be indicative that the user is no longer viewing display 512. In such an instance, advertisement facility 110 may dynamically select an audio-based advertisement for presentation to user 804 while the media content instance is paused.

Sensor 802 may be additionally or alternatively configured to monitor an interaction of user 804 with media content access device 500 and/or display 512 by detecting an ambient sound level within monitoring zone 806. As used herein, an "ambient sound" may refer to one or more sounds present within monitoring zone 806 that are not produced by media content access device 500 and/or display 512. For example, an ambient sound may be produced by or otherwise associated with user 804 and/or any other object within or adjacent to monitoring zone 806.

In some examples, an ambient sound level that is higher than a predetermined threshold level may indicate that user 804 is listening to something other than media content access device 500 and/or display 512. For example, user 804 may be engaged in a conversation with another person. In such instances, advertising facility 110 may dynamically select at least one video-based advertisement for presentation to user 804 while the media content instance being presented by media content access device 500 is paused. This is because a video-based advertisement may be more likely to be received by user 804 in the presence of a relatively high ambient sound level than an audio-based advertisement.

Alternatively, if the detected ambient sound level is lower than a predetermined threshold level, it may be indicative that user 804 may be more receptive to an audio-based advertisement than a video-based advertisement. For example, user 804 may be checking email or the like and therefore not visually engaged with display 512. Hence, advertisement facility 110 may dynamically select at least one audio-based advertisement to present to user 804 while the media content instance is paused.

Additionally or alternatively, sensor 802 may be configured to detect sounds representative of specific events performed by user 804. Advertisement facility 110 may then dynamically select one or more advertisements for presentation to the user while the media content instance is paused based on these specific activities performed by user 804. For example, sensor 802 may detect one or more sounds (e.g., yelling) that indicate that user 804 has engaged in a heated argument with a family member. Advertisement facility 110 may accordingly select an advertisement for counseling services to be presented to user 804 while the media content instance is paused.

Sensor 802 may be additionally or alternatively configured to monitor an interaction of user 804 with media content access device 500 and/or display 512 by detecting a presence of one or more objects within monitoring zone 806. Advertisement facility 110 may dynamically select one or more advertisements for presentation to user 804 while the media content instance is paused based on the detected one or more objects.

To illustrate, sensor 802 may include a video camera and associated image processing components configured to detect and recognize one or more objects within monitoring zone 806. For example, sensor 802 may detect a presence of a bag of potato chips within monitoring zone 806. Based on this detection, advertising facility 110 may dynamically select one or more advertisements related to snack foods (e.g., healthy alternatives to potato chips) for presentation to user 804 while the media content instance is paused.

In some examples, sensor 802 may perform the monitoring of the interaction of user 804 with media content access device 500 and/or display 512 for a predetermined period of time immediately prior to the receiving of the command to pause the media content instance. The predetermined period of time may be set to be any suitable period of time (e.g., 2-3 minutes) as may serve a particular application.

For example, sensor 802 may detect a number of commands input by user 804 to change a channel associated with media content access device 500 during a period of time right before user 804 pauses presentation of the media content instance. If the detected number of commands to change the channel is greater than a predetermined threshold number, it may indicate that user 804 is likely to not be fully engaged with media content access device 500. Therefore, it may be assumed that user 804 has a relatively short attention span. Advertisement facility 110 may accordingly select a relatively short advertisement (i.e., an advertisement having a duration less than or equal to a predetermined threshold duration) for presentation to the user while the media content instance is paused. The duration of the relatively short advertisement may vary as may serve a particular application.

Sensor 802 may be additionally or alternatively configured to monitor an interaction of user 804 with media content access device 500 and/or display 512 by detecting a trick play pattern performed by user 804 during a period of time right before user 804 pauses presentation of the media content instance. For example, sensor 802 may detect that user 804 has a tendency to skip over advertisements included within a media content stream. Hence, advertisement facility 110 may dynamically select those skipped advertisements to be presented to user 804 while the media content instance is paused.

In some examples, advertisement facility 110 may be further configured to dynamically select at least one advertisement for presentation to user 806 after presentation of the paused media content instance is resumed. The selection of the at least one advertisement may be performed in accordance with a monitored interaction of user 806 with media content access device 500 and/or display 512 (e.g., any of the monitored interactions described herein). In some examples, advertisement facility 110 may be further configured to base the selection on events that occurred in ordinary television programming and/or in real time news while the media content instance was paused.

For example, user 806 may pause a presentation of a sporting event known as the Super Bowl being presented by media content access device 500 on display 512. While the presentation of the game is paused, one of the teams playing in the Super Bowl may win the game. When user 806 resumes presentation of the Super Bowl, advertisement facility 110 may select one or more advertisements associated with the winning team to be presented to user 806.

In some examples, advertisement facility 110 may be configured to base one or more advertisements selected for presentation to a user during and/or after a time period during which a media content instance being presented by access subsystem 204 is paused on an interaction profile associated with the user. As mentioned previously, interaction profile facility 108 may be configured to maintain an interaction profile associated with a user of access subsystem 204. The interaction profile may be configured to represent how the user interacts with the media content access subsystem and may be dynamically updated by interaction profile facility 108 as monitoring facility 106 detects various interaction events performed by the user.

The interaction profile may be maintained by interaction profile facility 108 in accordance with any suitable heuristic or algorithm. In some examples, data representative of detected interaction events, timestamps associated with the detected interaction events, and/or any other data associated with the interaction events (e.g., metadata corresponding to media content being presented during an occurrence of the interaction events) may be processed by interaction profile facility 108 to generate and/or update the interaction profile. It will be recognized that an interaction profile may correspond to a single user of access subsystem 204 or to multiple users of access subsystem 204 as may serve a particular application.

In some examples, monitoring facility 106 is configured to continuously or periodically monitor interaction of a user with access subsystem 204. In this manner, an interaction profile may be dynamically updated over time, thereby resulting in a more customized advertisement experience for the user.

In some examples, an interaction profile associated with a user of access subsystem 204 may be representative of one or more moods or emotional states of a user. For example, one or more interaction events performed by the user may be associated with a particular mood that the user is in. Similar interaction events detected thereafter may indicate that the user in the particular mood. Advertisement facility 110 may accordingly select one or more advertisements configured to target people in that mood.

In some examples, advertisement facility 110 may be further configured to select at least one advertisement for presentation to a user in accordance with a user profile associated with the user. As used herein, a user profile is configured to represent one or more personal traits associated with the user that are not already defined within an interaction profile associated with the user. For example, a user profile may include data representative of a user's age, gender, income level, profession, family status, nationality, preferred genre of media content, etc. Such information may be used to further customize the presentation of advertisements to the user.

As detailed above, the methods and systems described herein facilitate dynamic selection of one or more advertisements for presentation to a user while a media content instance is paused. As an example, an exemplary method includes monitoring an interaction of a user with a media content access subsystem, receiving a command input by the user to pause a media content instance being presented by the media content access subsystem, and dynamically selecting at least one advertisement in accordance with the monitored interaction for presentation to the user by the media content access subsystem while the media content instance is paused.

An exemplary system includes a monitoring facility configured to monitor an interaction of a user with a media content access device, a digital video recording facility configured to receive and execute a command input by the user to pause a media content instance being presented by the media content access subsystem, and an advertisement facility configured to dynamically select at least one advertisement in accordance with the monitored interaction for presentation to the user by the media content access subsystem while the media content instance is paused.

Another exemplary system includes a media content access device configured to present a media content instance on a display and at least one sensor communicatively coupled to the media content access device and configured to monitor an interaction of a user with the media content access device. The media content access device is further configured to receive and execute a command input by the user to pause the media content instance and present at least one advertisement selected in accordance with the monitored interaction to the user while the media content instance is paused.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving a command input by a user to pause a media content instance being presented by a media content access subsystem by way of a display screen;
pausing the media content instance in response to the receiving of the command;
monitoring an interaction of the user with the media content access subsystem within a physical area in which the user is located and during a period of time in which the media content instance is paused in response to the receiving of the command;
determining, based on the monitored interaction while the media content instance is paused, that the user is viewing the display screen while the media content instance is paused;
dynamically selecting, in response to the determining that the user is viewing the display screen while the media content instance is paused, a visual-based advertisement included in a first data stream provided by a media content provider subsystem communicatively coupled to the media content access subsystem by way of a network and that focuses on a visual message for presentation to the user by the media content access subsystem while the media content instance is paused; and
determining, after the visual-based advertisement is presented to the user and based on the monitored interaction while the media content instance is paused, that the user is no longer viewing the display screen while the media content instance is paused; and
dynamically selecting, in response to the determining that the user is not viewing the display screen while the media content instance is paused, an audio-based advertisement included in a second data stream provided by the media content provider subsystem and that focuses on an audio message for presentation to the user by the media content access subsystem while the media content instance is paused, wherein the visual message and the audio message are from different advertisements.

2. The method of claim 1, further comprising
monitoring an interaction of the user with the media content access subsystem for a predetermined period of time immediately prior to the command being input by the user to pause the media content instance;
wherein the dynamic selection of at least one of the video-based advertisement and the audio-based advertisement is further performed in accordance with the monitored interaction during the predetermined period of time.

3. The method of claim 1, wherein the monitoring comprises detecting a movement of the user within a monitoring zone associated with the physical area in which the user is located and the media content access subsystem while the media content instance is paused.

4. The method of claim 3, wherein, when the detected movement of the user indicates that the user has moved outside of the monitoring zone, the monitored interaction indicates that the user is not viewing the display screen while the media content instance is paused.

5. The method of claim 1, wherein the monitoring comprises detecting a handling of a remote control device associated with the media content access subsystem.

6. The method of claim 5, wherein:
the monitored interaction indicates that the user is not viewing the display screen while the media content instance is paused if the detected handling indicates that the user is not handling the remote control device; and
the monitored interaction indicates that the user is viewing the display screen while the media content instance is paused if the detected handling indicates that the user is handling the remote control device.

7. The method of claim 1, further comprising detecting an ambient sound level within a monitoring zone associated with the physical area in which the user is located and the media content access subsystem.

8. The method of claim 7, further comprising selecting an additional visual-based advertisement for presentation to the user by the media content access subsystem while the media content instance is paused if the detected ambient sound level is higher than a predetermined threshold level and selecting an additional audio-based advertisement for presentation to the user by the media content access subsystem while the media content instance is paused if the detected ambient sound level is lower than the predetermined threshold level.

9. The method of claim 1, further comprising:
detecting a presence of one or more objects within a monitoring zone associated with the physical area in which the user is located and the media content access subsystem, and
selecting an advertisement associated with the one or more objects for presentation to the user by the media content access subsystem while the media content instance is paused.

10. The method of claim 1, further comprising detecting a number of commands input by the user to change a channel associated with the media content access subsystem during a predetermined period of time immediately prior to the receiving of the command to pause the media content instance.

11. The method of claim 10, further comprising selecting at least one advertisement having a duration less than or equal to a predetermined threshold duration for presentation to the user by the media content access subsystem while the media content instance is paused if the detected number of commands is greater than a predetermined threshold number.

12. The method of claim 1, wherein the monitoring comprises detecting a trick play pattern during a predetermined period of time immediately prior to the receiving of the command to pause the media content instance.

13. The method of claim 1, further comprising:
maintaining an interaction profile associated with the user based on the monitored interaction;
wherein the dynamically selecting of the visual-based advertisement and the audio-based advertisement is further performed in accordance with the interaction profile.

14. The method of claim 1, further comprising dynamically selecting at least one additional advertisement in accordance with the monitored interaction for presentation to the user by the media content access subsystem after presentation of the media content instance is resumed.

15. The method of claim 1, embodied as computer-executable instructions on at least one tangible computer-readable medium.

16. A system comprising:
at least one computing device including at least one processor and comprising:
a digital video recording facility that receives a command input by a user to pause a media content instance being presented by a media content access subsystem by way of a display screen, and
pauses the media content instance in response to the receiving of the command;
a monitoring facility that monitors an interaction of the user with the media content access subsystem within a physical area in which the user is located and during a period of time in which the media content instance is paused in response to the digital video recording facility receiving the command; and an advertisement facility that determines, based on the monitored interaction while the media content instance is paused, that the user is viewing the display screen while the media content instance is paused, dynamically selects, in response to the determination that the user is viewing the display screen while the media content instance is paused, a visual-based advertisement included in a first data stream provided by a media content provider subsystem communicatively coupled to the media content access subsystem by way of a network and that focuses on a visual message for presentation to the user by the media content access subsystem while the media content instance is paused, determines, after the visual-based advertisement is presented to the user and based on the monitored interaction while the media content instance is paused, that the user is no longer viewing the display screen while the media content instance is paused, and dynamically selects, in response to the determination that the user is not viewing the display screen while the media content instance is paused, an audio-based advertisement included in a second data stream provided by the media content provider subsystem and that focuses on an audio message for presentation to the user by the media content access subsystem while the media content instance is paused, wherein the visual message and the audio message are from different advertisements.

17. The system of claim 16, wherein the monitoring facility further monitors an interaction of the user with the media content access subsystem for a predetermined period of time immediately prior to the command being input by the user to pause the media content instance;

wherein the advertisement facility is configured to perform the dynamic selection of at least one of the visual-based advertisement and the audio-based advertisement in accordance with the monitored interaction during the predetermined period of time.

18. The system of claim 16, wherein the advertisement facility dynamically selects at least one additional advertisement in accordance with the monitored interaction for presentation to the user after presentation of the media content instance is resumed.

19. A system comprising:

a media content access device that presents a media content instance on a display screen; and at least one sensor communicatively coupled to the media content access device;

wherein the media content access receives a command input by a user to pause the media content instance, pauses the media content instance in response to the receiving of the command, monitors an interaction of the user with the media content access device within a physical area in which the user is located and with the at least one sensor during a period of time in which the media content instance is paused in response to receiving the command, determines, based on the monitored interaction while the media content instance is paused, that the user is viewing the display screen while the media content instance is paused, dynamically selects, in response to the determination that the user is viewing the display screen while the media content instance is paused, a visual-based advertisement included in a first data stream provided by a media content provider subsystem communicatively coupled to the media content access device by way of a network and that focuses on a visual message for presentation to the user by the media content access device while the media content instance is paused, and determines, after the visual-based advertisement is presented to the user and based on the monitored interaction while the media content instance is paused, that the user is no longer viewing the display screen while the media content instance is paused, and dynamically selects, in response to the determination that the user is not viewing the display screen while the media content instance is paused, an audio-based advertisement included in a second data stream provided by the media content provider subsystem and that focuses on an audio message for presentation to the user by the media content access device while the media content instance is paused, wherein the visual message and the audio message are from different advertisements.

20. The system of claim 19, wherein the at least one sensor monitors the interaction of the user with the media content access device for a predetermined period of time immediately prior to the command being input by the user to pause the media content instance; and wherein the selection of at least one of the visual-based advertisement and the audio-based advertisement is further performed in accordance with the monitored interaction during the predetermined period of time.

21. The system of claim 19, wherein the media content access device is further presents at least one additional advertisement selected in accordance with the monitored interaction to the user after presentation of the media content instance is resumed.

22. The system of claim 19, wherein the at least one sensor comprises at least one of a video camera, a microphone, a motion detector, and an accelerometer.

* * * * *